(12) United States Patent
Matsubara et al.

(10) Patent No.: US 6,855,459 B2
(45) Date of Patent: Feb. 15, 2005

(54) ELECTRODE FOR RECHARGEABLE LITHIUM BATTERY, METHOD OF PREPARING SAME AND RECHARGEABLE LITHIUM BATTERY HAVING THE SAME

(75) Inventors: Keiko Matsubara, Yokohama (JP); Toshiaki Tsuno, Yokohama (JP); Akira Takamuku, Yokohama (JP); Kyou-Yoon Sheem, Ohsan (KR)

(73) Assignee: Samsung SDI Co., LTD, Suwon-si (KR)

( * ) Notice: Subject to any disclaimer, the term of this patent is extended or adjusted under 35 U.S.C. 154(b) by 0 days.

(21) Appl. No.: 10/463,859

(22) Filed: Jun. 18, 2003

(65) Prior Publication Data

US 2004/0041536 A1 Mar. 4, 2004

(30) Foreign Application Priority Data

Jun. 20, 2002 (JP) .......................................... 2002-180107
Sep. 18, 2002 (KR) ................................. 10-2002-0056916

(51) Int. Cl.⁷ ............................................... H01M 4/62
(52) U.S. Cl. ........................ 429/217; 429/232; 429/233
(58) Field of Search .................................. 429/217, 232, 429/233

(56) References Cited

U.S. PATENT DOCUMENTS 5,707,756 A * 1/1998 Inoue et al. .................. 429/57
2004/0096741 A1 * 5/2004 Goto et al. ................. 429/217

FOREIGN PATENT DOCUMENTS

JP          06-349482        12/1994

* cited by examiner

*Primary Examiner*—Laura Weiner
(74) *Attorney, Agent, or Firm*—Staas & Halsey LLP

(57) ABSTRACT

An electrode for a rechargeable lithium battery includes a current collector and an active material layer formed on the current collector. The active material layer includes an active material, a binder and a water-soluble polymer. The binder is a copolymer of (metha)acrylic acid and (metha)acrylic alkylester, and an amorphous polypropylene homopolymer or an amorphous copolymer of propylene and a $C_2$ to $C_8$ olefin.

9 Claims, 1 Drawing Sheet

ELECTRODE FOR RECHARGEABLE LITHIUM BATTERY, METHOD OF PREPARING SAME AND RECHARGEABLE LITHIUM BATTERY HAVING THE SAME

CROSS REFERENCE TO RELATED APPLICATIONS

This application is claimed the benefit of Japanese Patent Application No. 2002-180107, filed in the Japanese Patent Office on Jun. 20, 2002, and Korean Patent Application No. 2002-56916, filed in the Korean Intellectual Property Office on Sep. 18, 2002, the disclosures of which are incorporated hereinto by reference.

BACKGROUND OF THE INVENTION

1. Field of the Invention

The present invention relates to an electrode for a rechargeable lithium battery, a method of preparing the same, and a rechargeable lithium battery including the same.

2. Description of the Related Art

Recently, as a negative active material for rechargeable lithium batteries, carbonaceous materials that do not generate lithium dendrites have been introduced for use in place of lithium metal.

A negative electrode is produced by mixing a negative active material, and a binder, and optionally a conductive material in an organic solvent to prepare a negative active material composition and coating the composition on a current collector followed by drying.

Polyvinylidene fluoride is generally used as the binder. However, polyvinylidene fluoride is presented in the form of fiber which covers the negative active material, making it difficult for the active material to effectively perform its function. The polyvinylidene fluoride binder has slightly insufficient adhesion, which results in the separation of the negative active material from the current collector as charge and discharge cycles are repeated, thereby decreasing capacity and deteriorating cycle life characteristics.

Furthermore, N-methyl-2-pyrrolidone organic solvent, which is a good solvent for the polyvinylidene fluoride, generates a vapor that causes safety problems, so it should be removed.

In order to solve such shortcomings, studies on the use of styrene butadiene rubber and polytetrafluoroethylene as the binder have been undertaken. The materials do not cause the negative active material to be covered, and they can be used as aqueous solutions. However, these materials have poorer adhesion than polyvinylidene fluoride, so they substantially deteriorate cycle life characteristics.

SUMMARY OF THE INVENTION

It is an aspect of the present invention to provide an electrode for a rechargeable lithium battery in which superior adhesion of negative active material and improved cycle life characteristics are realized.

It is another aspect to provide an electrode for a rechargeable lithium battery exhibiting good cycle life characteristics.

It is still another aspect to provide a method of preparing the same.

It is still another aspect to provide a rechargeable lithium battery including the electrode.

Additional aspects and advantages of the invention will be set forth in part in the description which follows and, in part, will be obvious from the description, or may be learned by practice of the invention.

These and other aspects may be achieved by an electrode for a rechargeable lithium battery including a current collector, and an active material layer formed on the current collector. The active material layer includes an active material, a binder, and a water-soluble polymer. The binder is an amorphous polypropylene, a copolymer of (metha) acrylic acid and (metha)acrylic alkyl ester, and an amorphous polypropylene homopolymer or an amorphous copolymer of propylene and a $C_2$ to $C_8$ olefin.

In order to achieve these aspects and others, the present invention provides a rechargeable lithium battery including the electrode.

The present invention further includes a method of preparing the electrode. In this method, an aqueous dispersed solution of a binder, an active material and a water-soluble polymer are mixed to prepare an active material composition. The aqueous dispersed solution is prepared by dispersing an amorphous polypropylene homopolymer or an amorphous copolymer of propylene and a $C_2$ to $C_8$ olefin in water through a dispersant of (metha)acrylic acid and (metha) acrylic alkylester. The composition is coated on a current collector and dried at 60 to 180° C.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE EMBODIMENTS

Figure 1:
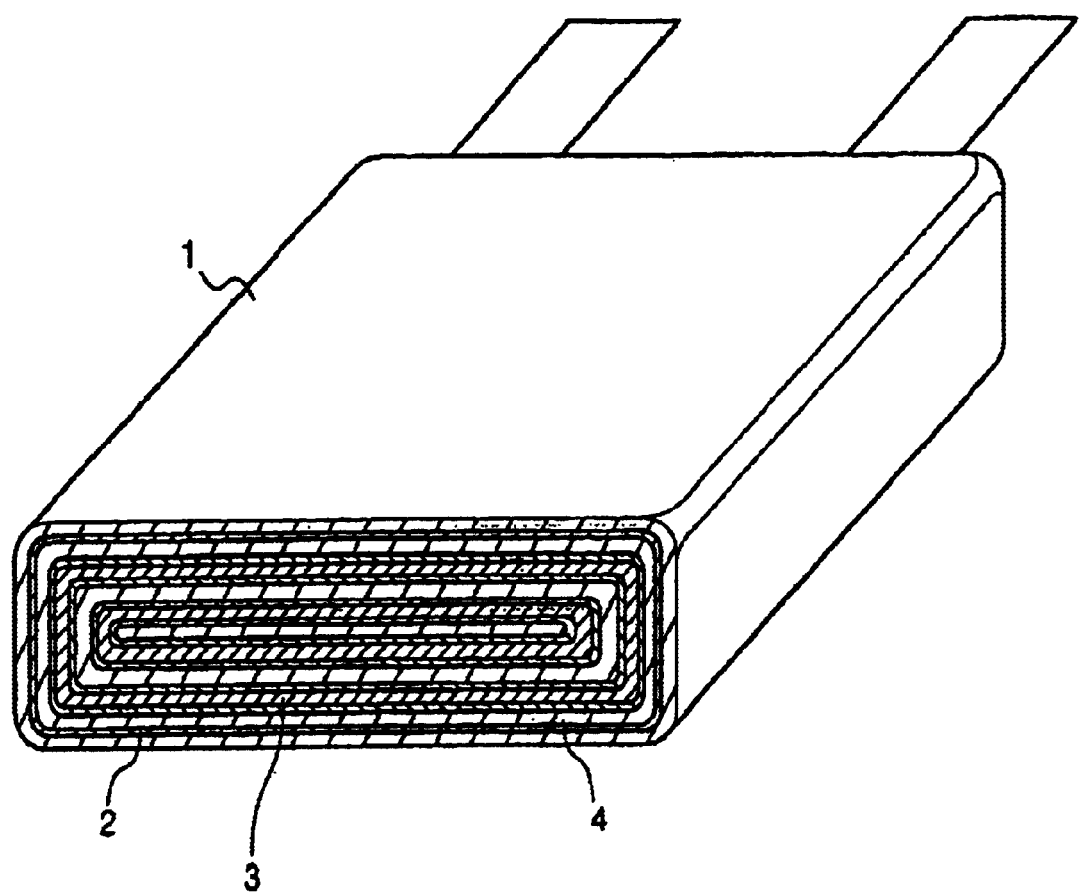
FIG. 1 shows a lithium battery according to an embodiment of the present invention.

Additional features and advantages of the invention will be set forth in the following description, and in part will be apparent from the description, or may be learned by practice of the invention. The advantages of the invention will be realized and attained by the structure particularly pointed our in the written description and claims hereof. It is to be understood that both the foregoing general description and the following detailed description are exemplary and explanatory and are intended to provide further explanation of the invention as claimed.

The present invention provides an electrode for a rechargeable lithium battery with a new binder. The new binder is an acrylate-based copolymer and an amorphous polymer including a specific amount of propylene. The amorphous polymer is an amorphous polypropylene homopolymer or a copolymer of propylene and a $C_2$ to $C_8$ olefin. The negative electrode further includes a water-soluble polymer as an agent for increasing viscosity.

The negative electrode of the present invention includes a current collector and an active material layer formed on the current collector. The active material layer includes an active material, a binder, and a water-soluble polymer. The binder includes a copolymer of (metha)acrylic acid and (metha) acrylic alkylester, and an amorphous polypropylene homopolymer or an amorphous copolymer of propylene and a $C_2$ to $C_8$ olefin.

In the electrode, the active material is firmly adhered on the current collector and the active material particles are firmly attached to each other, so that separation of the active material from the collector can be prevented as the charge and discharge cycles are repeated and therefore capacity loss is reduced.

The binder has better adhesion than a conventional polyvinylidene fluoride binder, which reduced the amount of binder needed. This allows the amount of active material to be increased which increases charge and discharge capacity, and it decreases the impedance, thereby improving high-rate characteristics.

The propylene is preferably presented in the amount of 50 wt % or more in the amorphous polymer, which renders good adhesion.

The electrode of the present invention includes 0.1 to 10 wt % of the binder based on the amount of active material. Such amount prevents separation of the active material from the collector, and a consequent decrease in battery performance.

The water-soluble polymer acts as an agent for increasing viscosity. The amount of the water-soluble polymer is preferably 0.1 to 10 wt % based on the active material. Such amount prevents separation of the active material from the collector, and a consequent decrease in battery performance. The water-soluble polymer may be carboxymethylcellulose (CMC), polyvinyl alcohol, polyvinylpyrrolidone, polyacrylic acid, polymethacrylic acid, polyethylene oxide, polyacrylamide, poly-N-isopropylearylamide, poly-N,N-dimethylacryamide, polyethyleneimine, polyoxyethylene, poly(2-methoxyethoxyethylene), poly(3-morpyrinylethylene), polyvinylsulfonic acid, polyvinylidene fluoride, or amylose. Most preferred is CMC. The CMC has a good ability to increase viscosity, it allows uniform coating, and has good adhesion so that it prevents the separation of the active material from the collector and it provides good cycle life characteristics.

The electrode is used in a rechargeable lithium battery, and in particular it is used as a negative electrode in the rechargeable lithium battery. The battery includes the electrode in which the active material is firmly adhered on a current collector and the active material particles bind together tightly, thereby preventing the separation of the active material from the current collector and preventing a decrease in capacity. In addition, the reduced amount of binder facilitates decrease in impedance, thereby improving high-rate characteristics.

A method of preparing the electrode will now be illustrated in more detail. An aqueous dispersed solution of a binder, an active material, and an agent for increasing viscosity are mixed to prepare an active material composition. The aqueous dispersed solution is prepared by dispersing an amorphous polypropylene homopolymer or an amorphous copolymer of propylene and a $C_2$ to $C_8$ olefin in water through a copolymer of a (metha)acrylic alkylester dispersant. The composition is coated on a current collector and dried at 60 to 180° C.

The binder and the agent for increasing viscosity are aqueous so that in the method it is not necessary to use organic solvents which require additional treatment equipment and causes environmental pollutions.

Hereinafter, the electrode of the present invention will be illustrated in more detail. The electrode of the present invention is preferably a negative electrode, and it includes a current collector and an active material layer formed on the current collector. The active material layer includes a negative active material, a binder, and a water-soluble polymer. The electrode may be in the form of a sheet, a cylinder, a disk, a plate or a column.

The negative active material is preferably one that is capable of intercalating and deintercalating lithium ions. Examples thereof are carbonaceous materials such as artificial graphite, natural graphite, graphitized carbon fiber, graphitized mesocarbon microbeads, fullerene, and amorphous carbon. Alternatively, a metal that is capable of forming a lithium alloy is used alone or together with the carbonaceous materials. The metal may be Al, Si, Sn, Pb, Zn, Bi, In, Mg, Ga, Cd, or Ge.

The negative electrode further includes a conductive material. The conductive material may be nickel powder, cobalt oxide, titanium oxide or carbon such as ketjen black, acetylene black, furnace black, graphite, carbon fiber, or fullerene.

The current collector may be a punched metal, ex-punched metal, metal foil, metal foam, a mesh metal fiber sintering material, nickel foil, or copper foil.

The binder includes binding materials and a dispersant, and it includes the binding materials dispersed in water through the dispersant. The binding materials are an amorphous polypropylene homopolymer or a copolymer of propylene and a $C_2$ to $C_8$ olefin, and they have a content of propylene of at least 50 wt %. The dispersant is a copolymer of (metha)acrylic acid and (metha)acrylic alkylester.

If the content of propylene is less than 50 wt %, the compatibility decreases and the adhesion decreases.

The binder is preferably an aqueous dispersed solution obtained from the binding material dispersed in water. The dispersant is a copolymer of (metha)acrylic acid and (metha)acrylic alkylester, and 10 to 80 mole % of (metha)acrylic acid and 90 to 20 mole % of at least two (metha)acrylic alkylesters. The dispersant is presented in the negative electrode.

The water-soluble polymer as the agent for increasing viscosity is presented in the amount of 0.1 to 10 wt % based on the active material. The water-soluble polymer in the aforementioned amount allows uniform coating and prevents separation of the active material from the collector and deterioration of battery performance.

The water-soluble polymer may be carboxymethylcellulose (CMC), polyvinyl alcohol, polyvinyl pyrrolidone, polyacrylic acid, polymethacrylic acid, polyethyleneoxide, polyacrylamide, poly-N-isopropylacrylamide, poly-N,N-dimethylacrylamide, polyethyleneimine, polyoxyethylene, poly(2-methoxyethoxyethylene), poly(3-morpyrinylethylene), polyvinylsulfonic acid, polyvinylidene fluoride, or amylase. Most preferred is CMC.

The amount of the binder is 0.05 to 20.0, preferably 0.1 to 10.0 parts by weight based on 100 parts by weight of the negative electrode. If the amount of the binder is less than 0.05 parts by weight, insufficient binding causes separation of the active material from the collector and a decrease in capacity. If the amount of the binder is more than 20 parts by weight, the impedance increases, deteriorating battery performance and flexibility.

The amount of the water-soluble polymer is 0.1 to 10.0 parts by weight (0.1 to 10 wt %) based on 100 parts by weight of the negative active material. If the amount of the water-soluble polymer is less than 0.1 parts by weight, viscosity decreases, causing uneven coating, and separation of the active material from the collector occurs, decreasing capacity. If the amount of the water-soluble polymer is more than 10 parts by weight, the impedance increases, causing uneven coating and decreasing flexibility.

The negative electrode is produced by mixing the aqueous dispersed solution of the binder and the water-soluble polymer in water followed by mixing it with a negative active material, to prepare an active material composition, and coating the composition and drying it at 60 to 180° C.

Alternatively, the negative electrode is produced by immersing the collector into the composition.

If the drying step is performed at less than 60° C., it is impossible to completely dry it such that a significant amount of water is left on the electrode. This water reacts with lithium to generate hydrogen gas. If the drying step is performed at more than 180° C., the binder and the water-soluble polymer pyrolyze.

The rechargeable lithium battery of the present invention includes a positive electrode. The positive electrode includes, for example, a material formed by mixing a positive active material and a binder such as polyvinylidene fluoride, and a conductive agent such as carbon black, and shaping it into a sheet or a circle form. Examples of the positive active material include at least one lithiated intercalation compound including lithium, and at least one selected from the group consisting of cobalt, manganese, and nickel, such as $LiMn_2O_4$, $LiCoO_2$, $LiNiO_2$, $LiFeO_2$, or $V_2O_5$. It further comprises a compound such as TiS, MoS, an organic disulfide compound, or an organic polysulfide compound, which are capable of reversible intercalation and deintercalation of lithium ions. The conductive agent may be ketjen black, acetylene black, furnace black, carbon fiber or fullerene, and the binder may be a water-soluble polymer such as polyvinylidene fluoride, carboxymethylcellulose, methylcellulose, and polysodium acrylate.

The rechargeable lithium battery includes a separator. The separator includes, but is not limited to polyethylene unwoven fiber, polypropylene unwoven fiber, polyamide unwoven fiber, or glass fiber.

An electrolyte used in the rechargeable lithium battery includes a lithium salt dissolved in a non-aqueous solvent.

The non-aqueous solvent includes, but is not limited to, propylene carbonate, ethylene carbonate, butylenes carbonate, benzonitrile, acetonitrile, tetrahydrofuran, 2-methyltetrahydrofuran, γ-butyrolactone, dioxolane, 4-methyldioxolane, N,N-dimethylformamide, dimethylacetoamide, dimethylsulfoxide, dioxane, 1,2-dimethoxyethane, sulforane, dichloroethane, chlorobenzene, nitrobenzene, dimethylcarbonate, methylethylcarbonate, diethylcarbonate, methylpropylcarbonate, methylisopropylcarbonate, ethylbutylcarbonate, dipropylcarbonate, diisopropylcarbonate, dibutylcarbonate, diethyleneglycol, dimethylether, or a mixture thereof, or any conventional solvent known for a rechargeable lithium battery in the art. Preferred is a mixture of one selected from propylene carbonate, ethylene carbonate, or butyl carbonate, and another selected from dimethyl carbonate, methylethyle carbonate or diethyl carbonate.

The lithium salt includes, but is not limited to, $LiPF_6$, $LiBF_4$, $LiSbF_6$, $LiAsF_6$, $LiClO_4$, $LiCF_3SO_3$, $Li(CF_3SO_2)_2N$, $LiC_4F_9SO_3$, $LiSbF_6$, $LiAlO_4$, $LiAlCl_4$, $LiN(C_xF_{2x+1}SO_2)(C_yF_{2y+1}SO_2)$ where, x and y are natural numbers, LiCl, LiI, or a mixture thereof. It also includes any conventional lithium salts known for a rechargeable lithium battery in the art. It preferably includes either one of $LiPF_6$ or $LiBF_4$.

Alternatively, the electrolyte may be a polymer electrolyte including polymers such as polyethylene oxide, polypropylene oxide, polyacrylonitrile, polyvinylidene fluoride, polymethacrylate, and polymethyl methacrylate.

The rechargeable lithium battery as shown in FIG. 1 includes the negative electrode 4, the positive electrode 3, a separator 2, and an electrolyte, which are put into a case 1. The battery exhibits good cycle life characteristics.

The following examples illustrate the present invention in further detail, but it is understood that the present invention is not limited by these examples.

Production of a Negative Electrode

EXAMPLE 1

An amorphous copolymer of propylene and 1-butene (content of propylene: 60 wt %; content of heptane-insoluble material: 0.1 wt %; density (25° C.): 0.87 g/cm$^3$; number-average molecular weight: 7,000; melting viscosity (190° C.): 20,000 mPa·s) was added to 26.8 parts by weight of an aqueous solution of an acryl-based copolymer. The aqueous solution was prepared by mixing 21 parts by weight of acrylic acid, 30 parts by weight of ethyl acrylate, 56.8 parts by weight of butylmethacrylate and 0.6 parts by weight of azobisisobutyronitrile, and polymerizing it.

To the mixture, 113.8 parts by weight of water were added. The resulting mixture was shaken to prepare an aqueous dispersed solution of the binder. The dispersed solution was added to 97 parts by weight of natural graphite with an average diameter of 18 μm until the sold content reached 1.5 parts by weight.

1.5 parts by weight of carboxymethylcellulose (CMC) and 110 parts by weight of water were added to the resulting material and they were shaken using a homogenizer for 30 minutes to prepare a negative active material slurry. The slurry was coated on a copper foil and dried at 130° C. for 10 minutes followed by pressing it until the thickness reached 100 μm and the density reached 1.6 g/cm$^3$, to produce a negative electrode.

COMPARATIVE EXAMPLE 1

A negative electrode was produced by the same procedure as in Example 1, except that 97 parts by weight of natural graphite, 1.5 parts by weight of styrene butadiene rubber, 1.5 parts by weight of CMC, and water were mixed to prepare a negative active material slurry.

COMPARATIVE EXAMPLE 2

A negative electrode was produced by the same procedure as in Example 1 except that 92 parts by weight of natural graphite and 8 parts by weight of polyvinylidene fluoride in NMP were used to prepare a negative active material slurry.

Each of the negative electrodes according to Example 1 and Comparative Examples 1 and 2 was cut into a width of 2.5 cm and a length of 15 cm. The cut electrode was attached to a plastic plate and 17 cm long adhesion tap was attached to the negative active layer. Using the product, a tensile strength was measured. The results are presented in Table 1.

TABLE 1

| | Tensile strength (mN/cm) |
|---|---|
| Example 1 | 1213 |
| Comparative Example 1 | 666 |
| Comparative Example 2 | 1057 |

As seen from Table 1, the tensile strength of the electrode according to Example 1 is higher than that according to Comparative Examples 1 and 2. This result indicates that the binder of the olefin-based amorphous copolymer and acrylate-based dispersant used in Example 1 has better adhesivity than those of Comparative Examples 1 and 2. It is considered that the result is partially derived from the CMC viscosity-increasing agent having slight adhesivity, but the lower tensile strength of Comparative Example 1 with CMC and without the inventive binder indicates that the inventive binder has good adhesion.

Fabrication of Cell

EXAMPLE 2

The negative electrode according to Example 1 was cut into a disk shape with a diameter of 13 mm. A polypropylene separator was interposed between the negative electrode and a lithium counter electrode to fabricate a coin-type half cell. As an electrolyte, 1 mol/L $LiPF_6$ dissolved in a mixed solvent of dimethyl carbonate, diethyl carbonate, and ethylene carbonate was used.

Battery Performance Measurements

The half cell was charged and discharged at a current density of 0.2 C, a charge cut-off voltage of 0V (Li/Li+) and a discharge cut-off voltage of 1.5V (Li/Li+) for 4 cycles. Thereafter, the cell was charged and discharged at a current density of 1 C, a charge cut-off voltage of 0V, and a discharge cut-off voltage of 1.5V for 50 cycles. The charge and discharge were performed at constant current/voltage, and the cut-off voltage of the constant voltage was set to 0.01 C. The discharge capacity retention was a percentage value obtained from a discharge capacity for 54 cycles to a discharge capacity for 1 cycle. The results are shown in Table 2.

EXAMPLE 3

A half cell was fabricated by the same procedure as in Example 2, except that 94 parts by weight of natural graphite, 3 parts by weight of aqueous binder used in Example 1, and 3 parts by weight of carboxymethylcellulose were used.

EXAMPLE 4

A half cell was fabricated by the same procedure as in Example 2, except that 99 parts by weight of natural graphite, 0.5 parts by weight of the aqueous binder used in Example 1, and 0.5 parts by weight of carboxymethyl cellulose were used.

EXAMPLE 5

A half cell was fabricated by the same procedure as in Example 1, except that a negative active material slurry was coated on a copper foil and dried at 200° C. for 10 minutes.

COMPARATIVE EXAMPLE 3

A half cell was fabricated by the same procedure as in Example 2, except that the electrode according to Comparative Example 1 was used.

COMPARATIVE EXAMPLE 4

A half cell was fabricated by the same procedure as in Example 2, except that the electrode according to Comparative Example 1 was used.

TABLE 2

| | | | 1 cycle (0.2C) | | | |
| --- | --- | --- | --- | --- | --- | --- |
| | Binder | Drying temperature (° C.) | Discharge capacity (mAh/g) | Charge and discharge efficiency (%) | 1 cycle (1C) Discharge capacity (mAh/g) | Capacity retention (54 cycles/ 1 cycle) |
| Example 2 | 1.5% of Inventive binder and 1.5% of CMC | 130 | 366 | 95.8 | 360 | 88.3 |
| Example 3 | 3.0% of Inventive binder and 3.0% of CMC | 130 | 358 | 94.2 | 348 | 83.6 |
| Example 4 | 0.5% of Inventive binder and 0.5% of CMC | 130 | 360 | 95.1 | 340 | 69.8 |
| Example 5 | 1.5% of Inventive binder and 1.5% of CMC | 200 | 355 | 92.7 | 321 | 65.9 |
| Comparative Example 3 | 1.5% of SBR and 1.5% of CMC | 130 | 365 | 94.5 | 357 | 81.1 |
| Comparative Example 4 | PVdF 8% | 130 | 358 | 92.2 | 342 | 70.5 |

As shown in Table 2, the cells according to Examples 2 and 3 respectively exhibit high discharge capacity of 366 mAh/g and 358 mAh/g at 0.2 C for 1 cycle, and 88.3% and 83.6% capacity retention. The somewhat lower values for Example 3 are believed to be a result of the greater amounts of the binder and the CMC (compared to Example 20) such that the amount of natural graphite is reduced.

The cell according to Example 4 exhibited a favorable discharge capacity of 360 mAh/g at 0.2 C for 1 cycle, but relatively low capacity retention of 69.8%. This is believed to be a result of the reduced amount of the binder causing a decrease in adhesion between the active material layer and the current collector.

The cell according to Example 5 exhibited a suitable discharge capacity of 355 mAh/g, but low capacity retention of 65.9%. This is believed to be a result of the higher drying temperature, 200° C., causing deterioration of adhesion of the binder.

The cell according to Comparative Example 3 exhibited lower capacity retention compared to Example 2, which used the same amount of binder as Comparative Example 3. This difference in cycle life characteristics is believed to be caused by the fact that the adhesion of SBR is less than that of the binder of the present invention.

Finally, the cell using 8% of PVdF exhibited lower capacity retention compared to Example 2. Therefore, it is evident that the binder of Comparative Example 4 is not as effective as that of the present invention.

Such results in Table 2 indicate that the inventive binder with an olefin-based amorphous copolymer and an acryl-based dispersant gives good adhesion between the current collector and the active material, and that good adhesion allows a decrease in the amount of the binder needed, hence a reduction in electrical insulation, thereby facilitating intercalation and deintercalation of lithium ions and improving cycle life characteristics.

While the present invention has been described in detail with reference to the preferred embodiments, those skilled in the art will appreciate that various modifications and substitutions can be made thereto without departing from the spirit and scope of the present invention as set forth in the accompanying claims and equivalents thereof.

What is claimed is:

1. An electrode for a rechargeable lithium battery comprising:

a current collector; and an active material layer formed on the current collector, the active material layer comprising an active material, a binder, and a water-soluble polymer, wherein the binder is a copolymer of a (metha)acrylic acid and a (metha)acrylic alkylester, and an amorphous polypropylene homopolymer or an amorphous copolymer of a propylene and a $C_2$ to $C_8$ olefin.

2. The electrode of claim 1, wherein the propylene is presented in an amount of 50 wt % or more in the amorphous copolymer.

3. The electrode of claim 1, wherein the binder is presented in an amount of 0.1 to 10 wt % based on a weight of the active material.

4. The electrode of claim 1, wherein the water-soluble polymer is presented in an amount of 0.1 to 10 wt % based on a weight of the active material.

5. A rechargeable lithium battery comprising:

an electrode comprising a current collector and an active material layer formed on the electrode, the active material layer comprising an active material, a binder, and a water-soluble polymer, wherein the binder is a copolymer of a (metha)acrylic acid and a (metha)acrylic alkylester, and an amorphous polypropylene homopolymer or an amorphous copolymer of a propylene and a $C_2$ to $C_8$ olefin.

6. The rechargeable lithium battery of claim 5, wherein the propylene is presented in an amount of 50 wt % or more in the amorphous copolymer.

7. The rechargeable lithium battery of claim 5, wherein the binder is presented in an amount of 0.1 to 10 wt % based on a weight of the active material.

8. The rechargeable lithium battery of claim 5, wherein the water-soluble polymer is presented in an amount of 0.1 to 10 wt % based on a weight of the active material.

9. A method of preparing an electrode for a rechargeable lithium battery comprising:

mixing an aqueous dispersed solution of a binder, an active material and a water-soluble polymer to prepare an active material composition, the aqueous dispersed solution being prepared by dispersing an amorphous polypropylene homopolymer or an amorphous copolymer of a propylene and a $C_2$ to $C_8$ olefin in water through a dispersant including a (metha)acrylic acid and a (metha)acrylic alkylester; and coating the composition on a current collector and drying it at 60 to 180° C.

* * * * *